Figure 1:
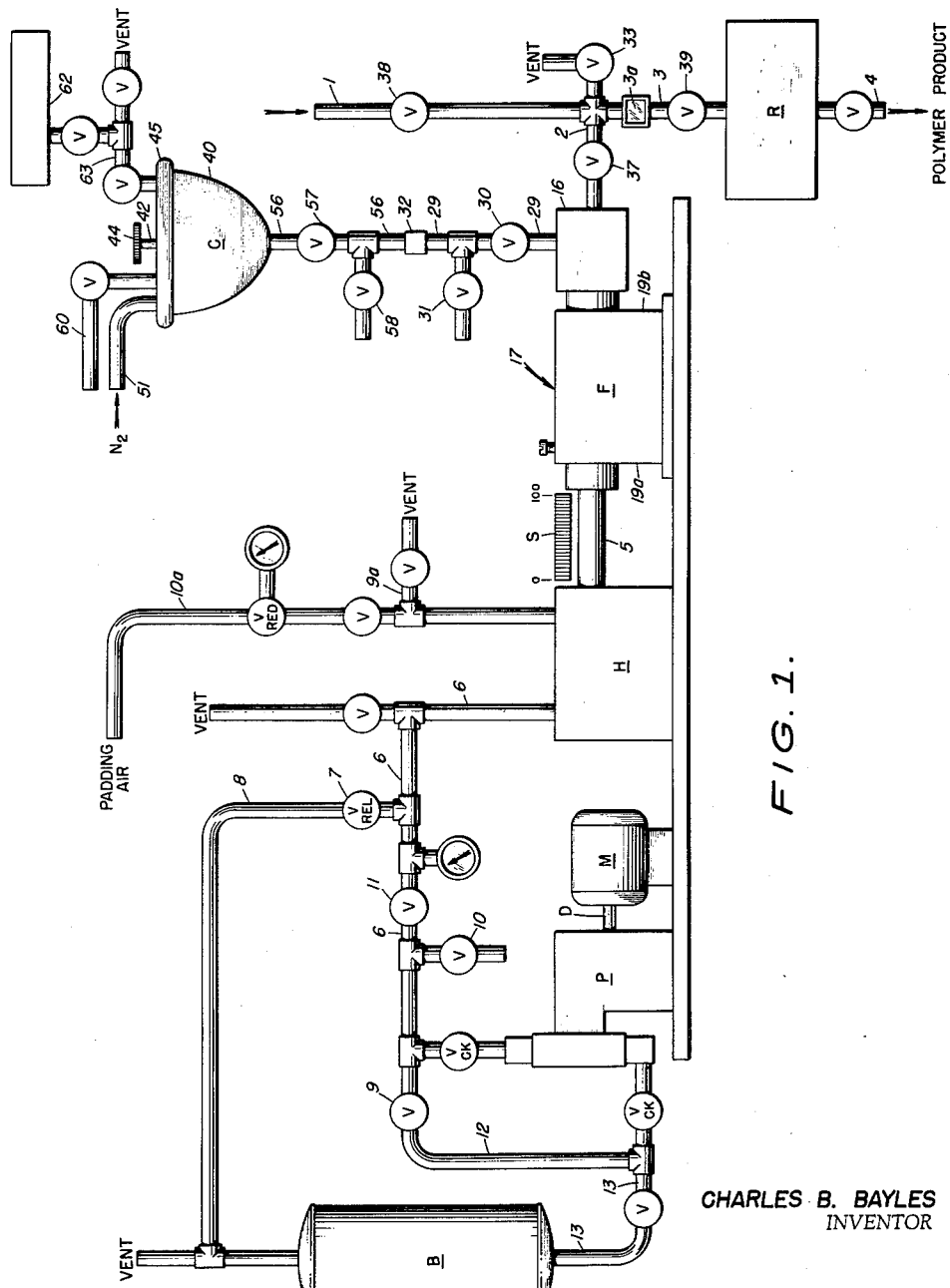

CHARLES B. BAYLES
INVENTOR

BY
AGENT

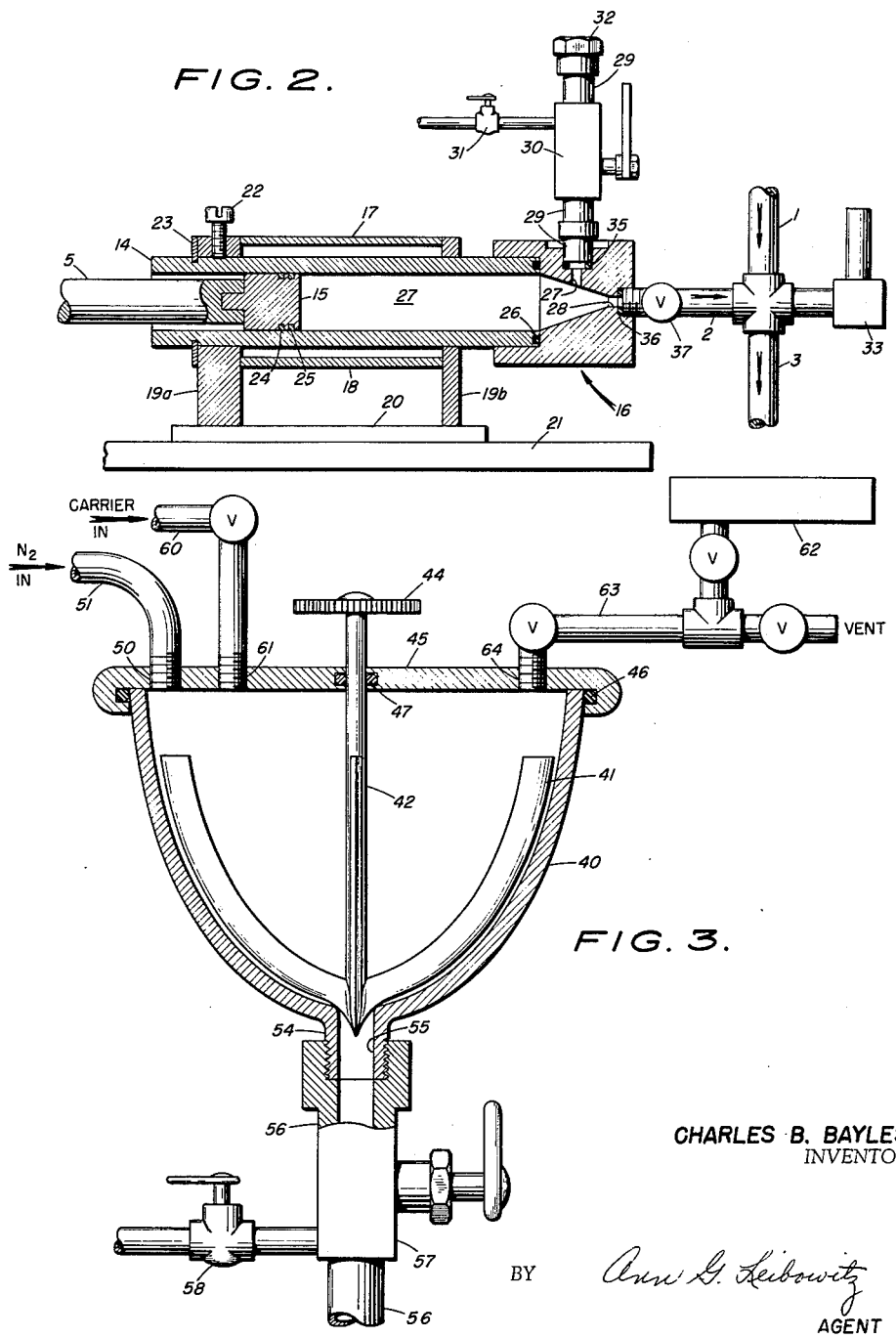

United States Patent Office 3,198,605
Patented Aug. 3, 1965

3,198,605
SYSTEM FOR HANDLING VISCOUS SOLID
CATALYST COMPOSITIONS
Charles B. Bayles, Severna Park, Md., assignor to W. R.
Grace & Co., New York, N.Y., a corporation of
Connecticut
Filed Dec. 4, 1962, Ser. No. 242,316
2 Claims. (Cl. 23—252)

This invention relates to an improved method and apparatus for handling viscous materials. In one particular aspect the invention pertains to an improved method and apparatus for continuously feeding small, accurately controlled amounts of catalyst to a pressurized olefin polymerization reactor while precluding atmospheric contamination of the catalyst or reactor contents, thus permitting continuous operation of the polymerization system.

There are many known processes for effecting the polymerization of normally gaseous 1-olefins to form solid polymers. In the most recent methods, generally known as "low-pressure" methods, a solid catalyst is fed to a reaction zone together with a suitable inert liquid diluent and the olefin to be polymerized, e.g., ethylene or propylene. In some even more recent processes for polymerizing higher olefins, e.g., propylene, an excess of the monomer itself is used as the inert diluent. In most cases, the polymerization is conducted at temperatures of from about 0° Fahrenheit to about 500° Fahrenheit and a pressure of from about 50 to about 500 pounds per square inch gauge. When the diluent used is the 1-olefin monomer the pressure must, of course, be sufficient to keep most of the monomer in the liquid phase during most of the reaction period. These various processes are fully described in e.g., U.S. Patent 2,825,721 (March 4, 1958) (catalyst: hexavalent chromia on silica-alumina support); numerous Belgian patents to Karl Ziegler (preferred catalyst: titanium halides plus organo-aluminum compounds); and U.S. Patent 3,002,961 (October 3, 1961) (liquid propylene as diluent).

Many difficulties arise in properly feeding the catalyst component required for the above described "low pressure" polymerization processes to the polymerization reactor. All of the catalysts are highly reactive with various fluids and gases which rapidly deactivates them, and greatly reduces the efficiency of the polymerization reaction. This is particularly true of the titanium and other heavy metal halides used in the Ziegler-type processes. As a result it has been found difficult, if not practically impossible, to obtain continuous polymerization processes by providing continuous controlled feed of catalyst to the reactor. Others have recently discovered that deactivation of Ziegler catalysts can be greatly reduced by thoroughly dispersing the metal halide, e.g., titanium halide, in mineral oil (e.g., liquid petrolatum) or petrolatum (also known as petroleum jelly, paraffin jelly, etc.). A typical commercial petrolatum product suitable for use in preparing the dispersions is thoroughly described at page 1147 (beginning at col. 1, bottom) of The Condensed Chemical Dictionary (Fifth Edition, Reinhold & Company—1956). The compositions thus formed can contain from about 80% to 50% or less (by weight) of the catalyst and the remainder, i.e., 50% or more to about 20% by weight of the carrier, e.g., petrolatum. All of these compositions are quite viscous, particularly those containing more than about 50% by weight of catalyst. Difficulties were experienced in attempting to continuously feed these compositions to pressurized polymerization reactors in small, accurately controlled amounts.

It is an object of this invention to provide a method and apparatus for solving these difficulties. It is another object of this invention to provide a method and apparatus suitable for continuously feeding viscous materials of any type in small, accurately controlled amounts. Still other objects of the invention will be apparent to those skilled in the art after consideration of the following more detailed disclosure.

A preferred embodiment of the invention will be described with reference to the accompanying drawings in which FIGURE 1 is a flowsheet showing schematically the apparatus of this invention together with one particular combination of associated devices that can be used for practicing the method of the invention;

FIGURE 2 is a detailed longitudinal view, partially in cross-section, of the feeder of this invention; and FIGURE 3 is an elevational view, partially in cross-section, of a detachable mixing and charging device used to prepare viscous mixes and to fill the feeder of FIGURE 2. Like reference characters indicate like elements throughout the several figures of the drawings.

Referring to FIGURE 1, the polymerization reactor R, is provided with a feed line 3, and a polymer product line 4. Inlet lines 1 and 2 are provided for the feed of 1-olefin monomer and catalyst composition, respectively, to reactor feed line 3. A sight glass 3a is usually provided to permit visual inspection of flow in line 3. Other feed lines (not shown) can also be provided, if desired, for admitting catalyst activator, inert diluents, etc., to the reactor.

Catalyst feeder F is filled with catalyst composition from the detachable mixing and charging device C. These two components of the system are described in detail below.

Pressure for forcing the viscous catalyst mixture from the feeder F is supplied by a hydraulic cylinder H via reciprocal piston rod 5. A metering scale S is mounted above the piston rod 5 to indicate the amount of catalyst composition in feeder F at all times. Near one end of hydraulic cylinder H is a line 6 for admission or withdrawal of hydraulic fluid. Optionally a line 10a is provided near the opposite end of the hydraulic cylinder for admitting air on the return side of the hydraulic cylinder thus bringing piston rod 5 back to its starting position. The return can also be accomplished simply by charging feeder F from charge cylinder C as more fully explained subsequently herein. Relief valve 7 and return line 8 are provided to set the maximum pressure in hydraulic cylinder H.

Hydraulic fluid is supplied to the cylinder H by pump P which is driven by drive shaft D connected to motor M. When the hydraulic cylinder is to be emptied, bypass valve 9 and valve 11 are opened and the fluid in the cylinder passes via lines 6, 12 and 13 to hydraulic fluid storage bomb B.

Referring now to FIGURE 2 it is seen that the feed device F has a cylinder 14, a close fitting piston 15, a cylinder head 16 and a cylinder support having top and bottom walls 17 and 18, end walls 19a and 19b, and a base 20 supported upon and rigidly secured in suitable manner to platform 21. The cross section of cylinder 14 and the corresponding perimeter of piston 15 can be of any desired shape, although a generally circular shape is usually preferred. Retaining ring 23 which is bolted or otherwise secured to end wall 19a, together with set screw 22 through the top of wall 19a, sets the proper spatial relationship between cylinder 14, piston 15 and the cylinder support. Seals 24, 25 and 26, e.g., rubber O-rings, are provided to prevent atmospheric contamination in the chamber 27 of the feed device.

Cylinder head 16 is provided with an inlet bore 27 and outlet bore 28. As shown in the drawings, the inlet bore communicates with conduit 29 which is in turn provided with a ball valve assembly shown generally at 30 and a vent line with valve 31. Connecting means 32 at the upper end of conduit 29 permit detachable communication between feeder F and the mixing and charging device C. Conduit 2 connected to the outlet bore 28 leads to the reactor feed line 3. The outlet bore can be closed by a ball valve, 37. The inlet and outlet bores can be provided with suitable seals 35, 36 (e.g., O-rings) to prevent atmospheric contamination in the cylinder head. In most cases a simple threaded engagement between the respective conduits and the cylinder head will be sufficient and are thus preferred.

Referring to FIGURE 3, it is seen that the mixing and charging device comprises a bowl 40, inwardly flared at the bottom, a mixing paddle 41, a rotatable drive rod 42 rigidly attached to the paddle and having a drive gear 44 at its free end. A cover 45 is tightly secured to the top of bowl 40 and in sealed relationship with the bowl and the drive rod by providing, e.g., rubber O-rings 46 and 47 respectively. A port 50 is also bored through the cover for admission of an inert gas via valved (not shown) pipe 51. Catalyst carrier (e.g., mineral oil) is fed to the bowl from a suitable supply source (not shown) via valved line 60 through port 61. Catalyst (e.g., solid, particulate titanium trichloride [$TiCl_3$]) is fed from container 62 through valved line 63 and port 64 to the mixer. A vent line permits purging of the catalyst container and feed line. The bottom of the mixing and charging bowl has an extension 54 which is provided with a bore 55 communicating with outlet line 56 which is in turn detachably connectable to line 29, which then leads to the feeder F (see also FIGURES 1 and 2). Line 56 is provided with a ball valve assembly 57 and a line with valve 58, similarly as inlet line 29 to the feeder.

The method of operating the apparatus will be apparent from the foregoing description of the drawings. In one specific example to be described below the apparatus was used to feed catalyst to a reactor in which propylene was polymerized to polypropylene. The monomer was used in liquid form and in large excess to serve as the sole significant reaction diluent medium. The catalyst used was a commercially available product consisting essentially of $TiCl_3$ prepared by reduction of $TiCl_4$ with aluminum. The catalyst was thoroughly mixed with white mineral oil (also known as liquid petroleum) in proportions to provide a composition containing 35 weight percent oil and 65 weight percent catalyst solids. The viscous mixture had a density of 1.37 grams per cubic centimeter.

The mixing and charging bowl used in this example was constructed wholly of stainless steel parts. Buna-N rubber O-rings were used as seals in all instances. The capacity of the bowl was about five (5) gallons. The bowl was flushed with dry nitrogen and filled with materials required for preparing catalyst composition. Valves 57 and 58 were closed and pipe 56 washed out with hexane.

The mixing and charging bowl is then connected to the feed line of the catalyst feeder by means of connector 32 and strapped in fixed position. The mixing paddle was rotated to form a substantially homogeneous catalyst composition. As mixing proceeded, the system was purged of air by opening valves 30, 31, 33, 37 and 58 and flowing nitrogen through valve 58 and out of valve 33 for sufficient time to remove all air (usually 10 to 15 minutes). Piston 15 was moved to its furthest position in cylinder head 16 of the feeder as the purging operation was carried out. Then valves 33, 37, 30, 31 and 58 were closed in the order named.

Valve 30 is reopened and nitrogen or other inert gas is admitted through line 51 to the top of the mixing and charging device. Valve 11 in line 6 to hydraulic cylinder H is then closed, discharge valve 57 of the charging device is slowly opened and then by-pass valve 9 of oil pump P is opened. Then valve 11 is reopened to permit hydraulic fluid to flow from the hydraulic cylinder back to the fluid storage bomb B. Catalyst composition was forced into feeder F and pushed piston rod 5 to its starting position, as shown on the scale S. At this point valve 11 was quickly closed, so that the piston in the feeder could not travel out of the feeder cylinder and permit loss of the catalyst charge. Valve 30 and valve 9 were then closed.

In the specific run here described the feeder cylinder had a capacity of about 600 cubic centimeters. All of its contact parts were constructed of stainless steel and the piston had a 2 inch diameter. The piston in hydraulic cylinder H had a diameter of 8 inches. Therefore 16 cubic centimeters of hydraulic fluid had to be pumped into the hydraulic cylinder to displace 1 cubic centimeter of catalyst composition out of the catalyst feeder. Other suitable ratios could be chosen.

Before commencing operation the piping between valves 38 and 39 of the feed lines to reactor R was suitably purged. A source of liquid propylene was then connected to line 1. When the pressure rose to about 50 pounds per square inch gauge above the pressure in reactor R, valves 38 and 39 are opened, thus allowing liquid propylene to enter the reactor. The catalyst feeder is then started up by opening valve 37 and then opening valve 11 in line 6, permitting hydraulic fluid (e.g., oil) in storage bomb B to be pumped by pump P into hydraulic cylinder H. The hydraulic piston is moved at a high rate initially so as to eliminate any gas pockets in the hydraulic fluid and in the catalyst compostion in the feeder. After catalyst is seen in the sight glass 3a the catalyst flow rate is adjusted to the desired rate by adjusting the rate at which oil is pumped into hydraulic cylinder H. In the specific system here described feed rates and corresponding pumping rates are shown in the following table. The recorded feed rates were essentially identical to the theoretical rate at all pump settings.

Table I

| Pump Setting [1] | Feed Rate [2] (grams of catalyst per hour) | Piston travel Rate [3] (millimeters per hour) |
| --- | --- | --- |
| 096 | 10 | 5.6 |
| 193 | 20 | 11.1 |
| 289 | 30 | 16.6 |
| 386 | 40 | 22.2 |
| 482 | 50 | 27.8 |
| 578 | 60 | 33.2 |
| 675 | 70 | 38.8 |
| 771 | 80 | 44.4 |
| 867 | 90 | 49.9 |
| 965 | 100 | 55.5 |
| 1,000 | 103 | 57.3 |

[1] At a setting of 1000 the pump will deliver 1860 cc. fluid/hr. to the hydraulic cylinder. Other settings deliver at proportionate rates.
[2] Catalyst solids fed, as 65% by weight mixture, in mineral oil with mixture density of 1.37 grams per cubic centimeter.
[3] Measured by travel of piston rod 5 as shown by scale S.

When the feeder was empty (i.e., when piston rod 5 had reached its maximum point in the feeder cylinder as indicated on scale S) the feeder was recharged. Since, in the example described, the charging device holds enough catalyst composition to fill the feeder twice, it is not necessary at this point to purge the lines before recharging the feeder. Recharging is accomplished by closing valve 37, then valve 11 and then turning off pump P. Valves 57, 30 and 9 are opened, valve 11 is reopened and the feeder is charged as described above. When piston rod 5 is pushed back to the zero starting point, valves 9, 11, 30 and 57 are closed, the pump P is started up again, valves 11 and 37 are reopened and the feeder is again on stream.

The mixing and charging device can be refilled for further use while the feeder is still in operation.

Pump delivery rates can be readily checked for calibration of the feeder rates by closing valve 11, opening valve 10 and collecting and measuring fluid delivered by the pump for a short time, e.g., several minutes. Any "Backlash" on the hydraulic system is virtually eliminated by maintaining padding air at 20 to 40 pounds per square inch gauge on the hydraulic cylinder via line 10. If desired, this air pressure can also be used to return piston rod 5 to its starting position when the feeder is to be charged, as has been previously explained.

In one particular run the above described method and apparatus was used to feed $TiCl_3$ catalyst mixture with 35% by weight of white mineral oil to a polymerization reactor at a rate of about 30 grams (of $TiCl_3$) per hour, together with liquid propylene at rates between 20 and 30 pounds per hour. About 60 grams per hour of diethylaluminum chloride was added separately to the reactor to act as a catalyst activator. The reactor was maintained at a temperature of about 150° Fahrenheit and a pressure of about 400 pounds per square inch gauge. The product slurry of polypropylene in liquid propylene was flashed at about atmospheric pressure and polymer solids were separated and collected. Solid polymer was recovered at rates of 20 to 30 pounds per hour (dry basis) as a mixture of 90–95% solids with 10 to 5% total volatiles (i.e., liquid propylene).

The catalyst feeder operated satisfactorily for periods in excess of 100 hours. The feeder could be charged in only 5 or 10 minutes and thus permitted essentially continuous operation of the polymerization reactor. By using the method and apparatus of this invention catalyst could be fed at closely controlled rates. Furthermore, the possibility of catalyst contamination and/or deactivation was essentially eliminated.

Many modifications and variations of the invention will be apparent to those skilled in the art and the illustrative details described above are not to be construed as limiting the invention other than defined as in the appended claims.

What is claimed is:
1. A device for preparing and continuously feeding accurately controlled amounts of viscous composition containing solid particulate catalyst to an olefin polymerization reactor operating at super atmospheric pressure comprising a sealed catalyst mixing chamber discharging to a hydraulically controlled metering cylinder, said metering cylinder discharging to said polymerization reactor;
   (1) Said mixing chamber having
      (a) an inlet conduit for feeding solid, particulate polymerization catalyst thereto;
      (b) separate inlet conduit for feeding solid catalyst carrier thereto;
      (c) a third conduit for introducing therein inert gas under pressure; and
      (d) an outlet conduit communicating with the charging inlet to said metering cylinder;
   (2) Said metering cylinder having
      (a) at one end a discharge outlet adapted to discharge to said reactor and a separate charging inlet to receive catalyst from said catalyst mixing chamber;
      (b) a close fitting piston reciprocally movable in said cylinder;
      (c) a valve for completely closing said discharge outlet when said chamber inlet is open; and
      (d) a valve for completely closing said charge inlet when said discharge outlet is open;
   (3) A second cylinder hydraulically actuating said metering cylinder and having
      (a) a conduit so shaped as to permit alternate feed and discharge of a hydraulic fluid from said second cylinder; and
      (b) a close fitting piston reciprocally movable in said second cylinder;
   (4) A piston rod fixedly attached between said pistons; and
   (5) A feed conduit communicating with the discharge outlet from said metering cylinder adapted to discharge catalyst from said metering cylinder into said polymerization reactor.
2. Device as defined in claim 1 further comprising
   (1) Means permitting flow of pressurized inert gas into said mixing chamber and simultaneous flow of hydraulic fluid out of said second cylinder when said metering cylinder is being charged with catalyst composition, and
   (2) Means for forcing hydraulic fluid into said second cylinder when the discharge outlet from said metering cylinder is open.

References Cited by the Examiner
UNITED STATES PATENTS
2,310,377  2/43  Voorhees.
2,338,606  1/44  Voorhees _____ 23—289 X MORRIS O. WOLK, *Primary Examiner.*
JAMES H. TAYMAN, JR., *Examiner.*